(12) United States Patent
Ursino et al.

(10) Patent No.: US 9,168,854 B2
(45) Date of Patent: Oct. 27, 2015

(54) VEHICLE SEAT WITH PROTECTIVE CLOTH ANCHORING FLAPS, AND METHOD OF MAKING THE SAME

(75) Inventors: Giorgio Ursino, Collegno (IT); Maurizio Atragene, Grugliasco (IT); Domenico Fedele, Turin (IT)

(73) Assignee: Lear Corporation, Southfield, MI (US)

( * ) Notice: Subject to any disclaimer, the term of this patent is extended or adjusted under 35 U.S.C. 154(b) by 343 days.

(21) Appl. No.: 13/110,268

(22) Filed: May 18, 2011

(65) Prior Publication Data
US 2012/0292976 A1   Nov. 22, 2012

(51) Int. Cl.
*A47C 7/02* (2006.01)
*B60N 2/58* (2006.01)
*B60N 2/70* (2006.01)

(52) U.S. Cl.
CPC ............ *B60N 2/5825* (2013.01); *B60N 2/5891* (2013.01); *B60N 2/7017* (2013.01)

(58) Field of Classification Search
USPC ................. 297/452.61, 218.1–218.5, 452.58, 297/452.59, 452.6
See application file for complete search history.

(56) References Cited

U.S. PATENT DOCUMENTS

| | | | | |
|---|---|---|---|---|
| 3,630,572 | A | * | 12/1971 | Homier ..................... 297/452.6 |
| 4,534,595 | A | * | 8/1985 | Abe et al. ................. 297/452.61 |
| 4,699,427 | A | * | 10/1987 | Kobayashi ............... 297/452.62 |
| 4,834,458 | A |   | 5/1989 | Izumida et al. |
| 4,973,105 | A | * | 11/1990 | Itou ........................... 297/344.12 |
| 5,879,051 | A |   | 3/1999 | Cozzani |
| 6,076,888 | A | * | 6/2000 | Turletti ..................... 297/218.3 |
| 6,612,648 | B1 |   | 9/2003 | Hashiguchi |
| 6,817,675 | B2 | * | 11/2004 | Buss et al. ................. 297/452.6 |
| 7,255,404 | B2 |   | 8/2007 | Neale |
| 7,506,939 | B2 | * | 3/2009 | Brockschneider et al. 297/452.6 |
| 2006/0061192 | A1 | * | 3/2006 | Flegal et al. ............... 297/452.6 |
| 2013/0181499 | A1 | * | 7/2013 | Suenaga et al. .......... 297/452.58 |

* cited by examiner

*Primary Examiner* — David R Dunn
*Assistant Examiner* — Alexander Harrison
(74) *Attorney, Agent, or Firm* — Brooks Kushman P.C.

(57) ABSTRACT

A vehicle seat base is provided with a foam bun that includes a protective cloth that is molded into the foam bun and attached with the seat cover material to the seat frame. A suspension mat is attached to the protective cloth below the foam bun to add support.

11 Claims, 4 Drawing Sheets

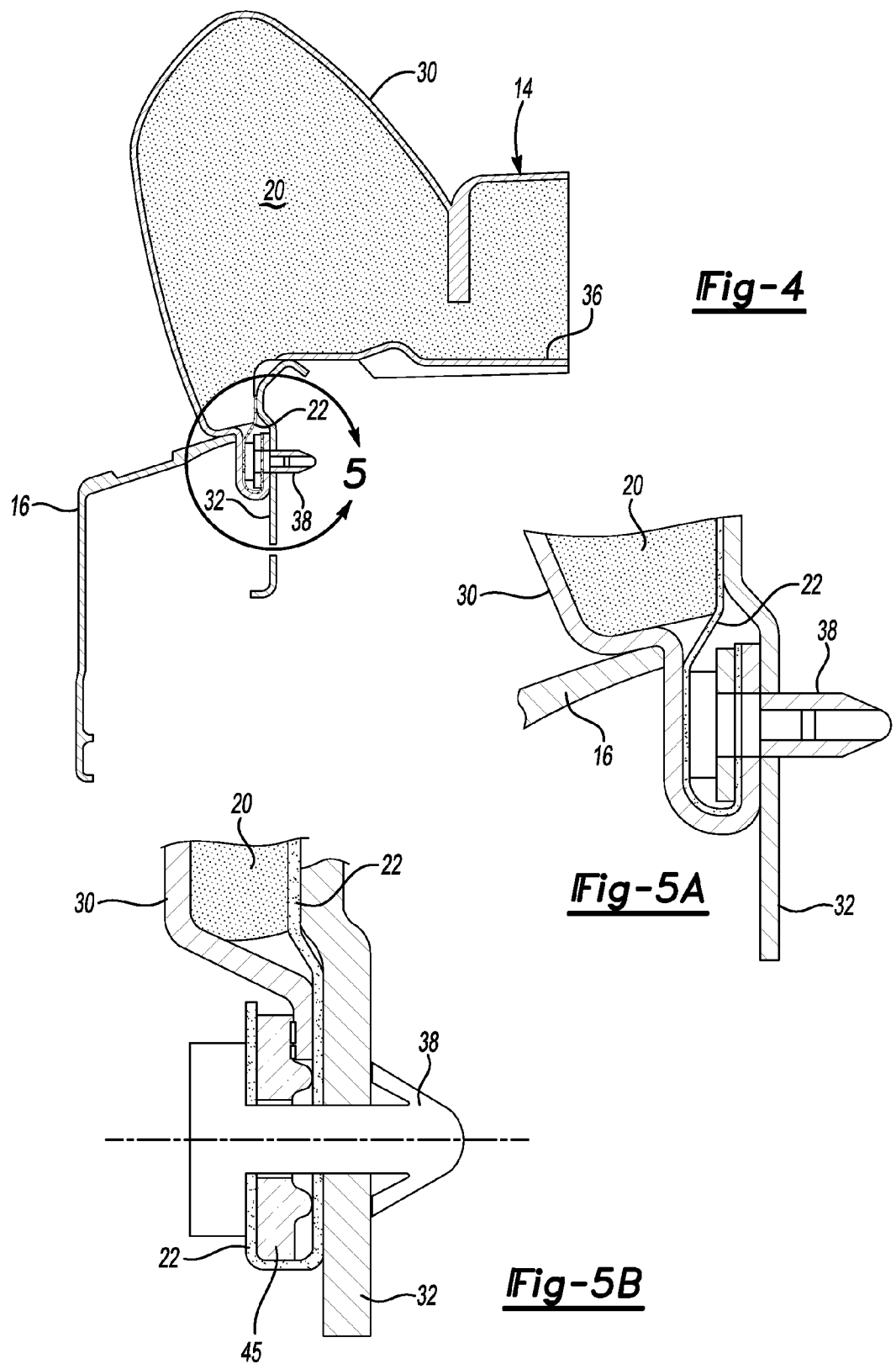

VEHICLE SEAT WITH PROTECTIVE CLOTH ANCHORING FLAPS, AND METHOD OF MAKING THE SAME

TECHNICAL FIELD

This patent application relates to a vehicle seat that has a protective cloth including flaps that are secured with the seat cover to the seat frame.

BACKGROUND

Vehicle seats of conventional design generally include a seat base and a seat back. The seat base and seat back each have a frame, a foam bun, and a seat cover that maybe made of vinyl, leather or cloth. Portions of the seat buns that may or may not be covered by the seat cover material may be covered by a protective cloth. The protective cloth may cover and protect portions of the foam bun that are not covered by the seat cover material. The protective cloth is normally trimmed or sized to conform to selected portions of the foam bun.

Some vehicle seats include steel suspensions that may be formed as part of the frame or may be assembled to the foam bun. Resilient, durable mesh suspension nets may also be provided as part of the vehicle seat structures that are used to support the foam buns. Suspensions are used to support the bottom of a seat base to provide comfort for the seat occupant and support for the foam bun.

One problem with vehicle seats is that the foam may shift or otherwise be forced through the interface between the seat cover and cover pieces. Cover pieces are plastic molded parts that are attached to the sides of seats to conceal seat hardware and also may be used to support seat control switches and actuators. The foam bun may have portions that may be forced between the seat cover, cover pieces and the frame of the vehicle seat. Any portions of the foam bun that is visible on a vehicle seat is objectionable. In addition, foam that works into the interface area of the suspension and frame may cause undesirable noises and should be avoided.

The above shortcomings and problems associated with some vehicle seat structures are addressed by applicant's invention as summarized below.

SUMMARY

According to one aspect of the present invention a vehicle seat is provided that comprises a frame to which a foam bun is attached that is partially en-closed by a seat cover. A protective cloth is molded into the base surface of a foam bun that includes at least one cloth flap extending outwardly from the base surface of the foam bun. The cloth flap extends to the frame and is secured to the frame by at least one fastener.

According to another aspect of applicant's disclosure, the frame may be a base frame from the base portion of the vehicle seat and the foam bun is the seat base. The protective cloth is molded into the bottom surface of the seat base and extends across the width of the seat base. The seat cover extends across the upper surface of the foam bun and downwardly over the sides of the foam bun. The seat cover and cloth flap are secured by the same fasteners to the frame. The seat cover and protective cloth may be attached to the frame to completely envelop selected portions of the foam bun. The cloth flaps of the protective cloth may comprise right and left flaps or front and back flaps that extend outwardly from the respective portion of the seat base.

According to another aspect of applicant's disclosure, a vehicle seat is provided as described above that includes a frame, foam bun, seat cover and protective cloth. In addition, a suspension mat may be disposed below a lower surface of the foam bun that supports the foam bun and is secured to the protective cloth. The suspension mat is secured to the protective cloth at a location on the protective cloth that is inboard of the at least one cloth flap. The suspension mat may be molded into the foam bun without being integrated into the foam bun. The suspension mat may be assembled onto the foam bun and attached by clips that secure spaced portions of the suspension mat to the protective cloth. The suspension mat may be assembled onto the foam bun and maybe sewn or connected by hooks at spaced locations to the protective cloth.

According to another aspect of applicant's disclosure, a method of making a vehicle seat is disclosed. Frame and seat covers are selected for the vehicle seat. In addition, a protective cloth is placed into a mold that defines a mold cavity with a plurality of flaps extending outwardly from the mold cavity.

BRIEF DESCRIPTION OF THE DRAWINGS

FIG. 4 is a fragmentary cross-sectional view of a vehicle seat attached to a portion of the seat frame;

FIG. 5A is a magnified view of circle 5 and FIG. 4;

FIG. 5B is an alternative to the attachment apparatus shown in FIG. 5A;

DETAILED DESCRIPTION

Figure 1:
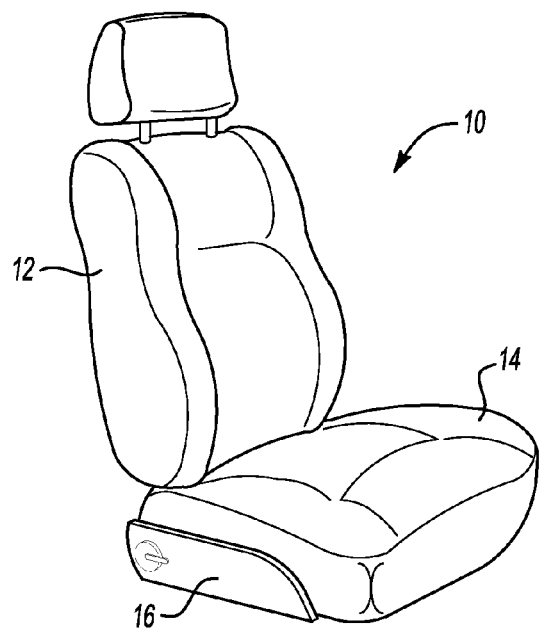
FIG. 1 is a perspective view of the vehicle seat.

Referring to FIG. 1, a vehicle seat 10 and is shown to include a seat back 12 and a seat base 14. A cover piece 16 is shown attached to the seat base that may be used to conceal from view some portions of the seat base 14.

Figure 2:
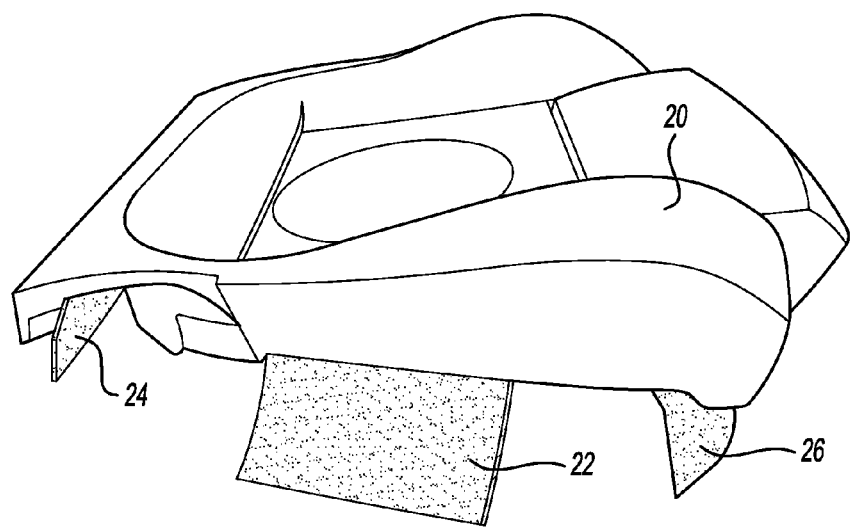
FIG. 2 is a perspective view of a vehicle seat base having flap of a protective cloth extending outwardly from a foam bun.

Referring to FIG. 2, a foam bun 20 is illustrated that is used in the construction of a seat base 14 (as shown in FIG. 1). The foam bun includes a right side flap 22 and a rear flap 24 that are partially molded into the foam bun 20. A front flap 26 may also be provided that is similar to the rear flap 24 but extends outwardly from the front of the foam bun 20.

Figure 3:
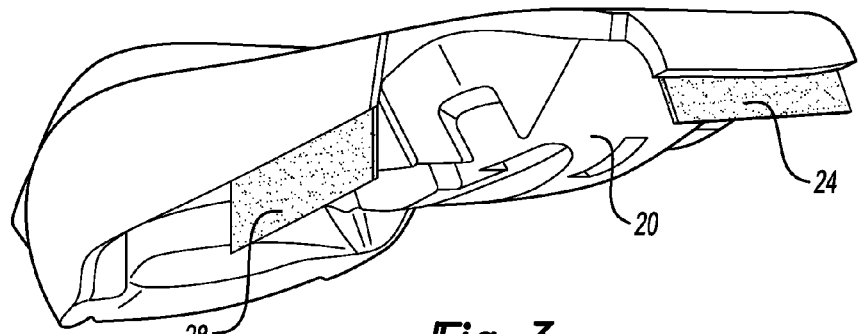
FIG. 3 is a bottom rear perspective view of a foam bun for a seat base having flaps extending outwardly from the foam bun.

Referring to FIG. 3, a left side flap 28 and a rear flap 24 are shown extending from the opposite side of the foam bun 20 that is shown in FIG. 2.

Referring to FIGS. 4 and 5A, a portion of the seat base 14 is shown to include a foam bun 20 that is partially covered by a seat cover 30. The seat cover 30 may be formed of leather, cloth, vinyl or other textile material. The seat base 14 is shown connected to a seat frame 32 with the juncture of the seat frame 32 and seat cover 30 being partially concealed by a molded plastic cover piece 16. The seat cover 30 covers the upper and side portions of the foam bun 20.

A protective cover 36 is molded into the foam bun 20 on the lower side of the foam bun 20. The protective cover 36 is secured by a fastener with the seat cover 30 to the seat frame 32. The fastener 38 is preferably a push pin type fastener that secures the protective cover 36 and seat cover 30 to the seat frame 32.

As shown in FIG. 5A, the right side flap 22 extends outwardly from the foam bun 20 and is placed in a face-to-face orientation with the seat cover 30. The seat cover 30 and flap 22 receive the fastener 38 that is then secured to the seat frame 32.

As shown in FIG. 5B, the right side flap 22 extends outwardly from the foam bun 20 and wraps both sides of a seat cover 30 that is provided with a plastic edge member 45. The push pin fastener 38 is inserted through the flap 22 and the plastic edge member 45 and is secured to the frame 32.

Figure 6:
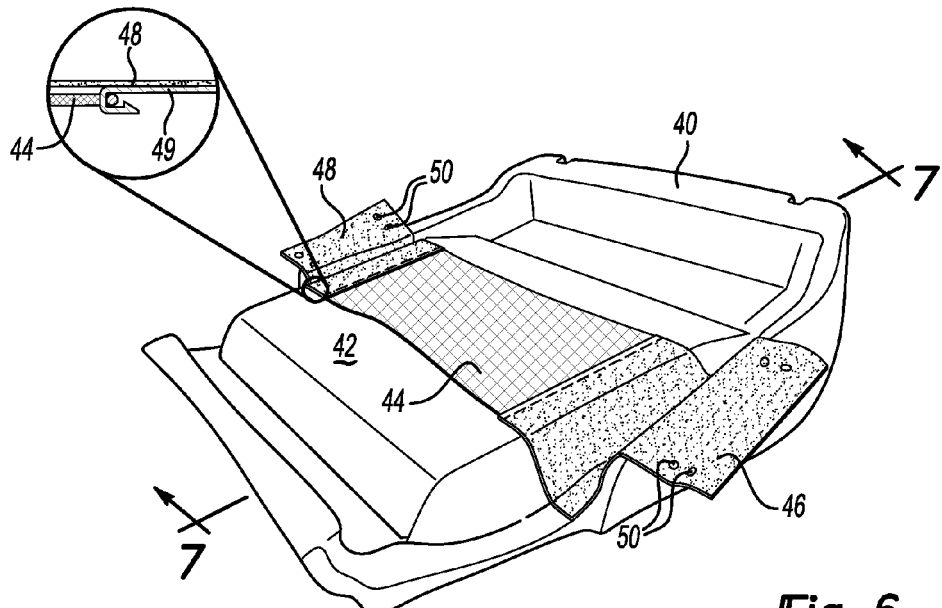
FIG. 6 is a bottom perspective view of a vehicle seat base foam bun having a suspension mesh and protective cloth including flaps.

Referring to FIG. 6, an alternative embodiment is shown. A foam bun 40 has a lower surface 42 that is spanned by a mesh suspension 44. A right flap 46 and left flap 48 are sewn or otherwise secured by J-clips 49 or the like to the opposite sides of the mesh suspension 44 and extend laterally outwardly from the foam bun 40. The right cloth flap 46 and left cloth flap 48 include holes 50 that are provided to receive a fastener 38 (as shown in FIGS. 4 and 5). Alternatively, J-hooks 49 could be used in place of or in conjunction with the fasteners 38 to attach the cover 30 and cloth flaps 44 and 46 to the seat frame 32.

Figure 7:
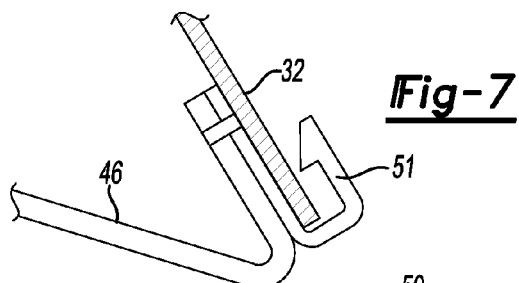
FIG. 7 is a fragmentary cross-sectional view of the cloth flap attached to the frame by a J-hook.

Referring to FIG. 7, an alternative attachment mechanism is illustrated in which the cloth flap 46 is attached to the frame 32 by a plastic J-hook 51.

Figure 8:
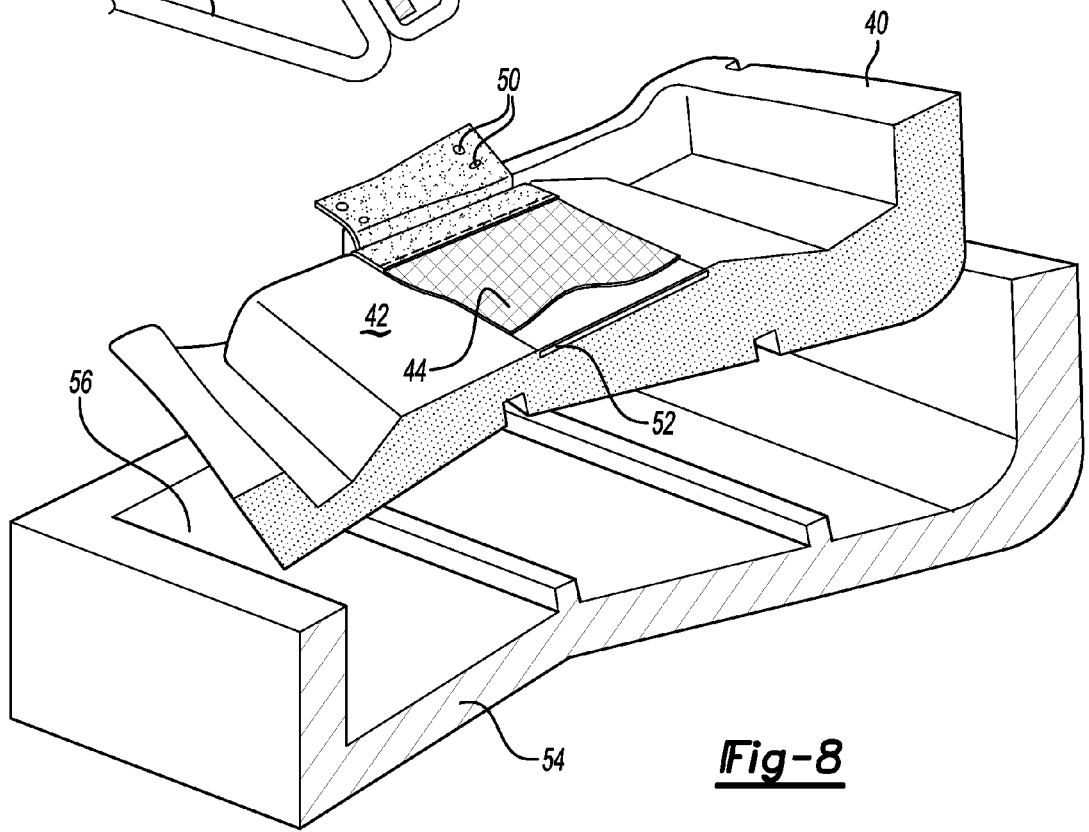
FIG. 8 is a cross sectional view taken along line 7 in FIG. 6.

Referring to FIG. 8, an embedded portion of the protective cloth 52 may be provided that it embedded into the foam bun 40. The mesh suspension mat 44 is attached to the right and left cloth flaps 46 and 48. The suspension mat 44 may be molded into the foam bun 20 or it may be applied after molding and before saddling, or covering, the seat with the seat cover 30. If the suspension mat 44 is molded into the foam bun 20, care should be taken to not integrate the suspension mat 44 into the foam material. That may happen if the suspension mat 44 melts in the course of the foam molding process. The cloth flaps 46 and 48 may be provided as an extension of the protective cloth 36 outboard of the foam. The protective cloth 36 may be molded into the foam, as shown in FIG. 8. More commonly, the cloth flaps 46 and 48 could be sewn to the suspension mat that may or may not be molded into the foam bun.

As also shown in FIG. 8, a mold 54 having a mold cavity 56 is used to form the foam bun 20 in an injection molded foam molding process.

Figure 9:
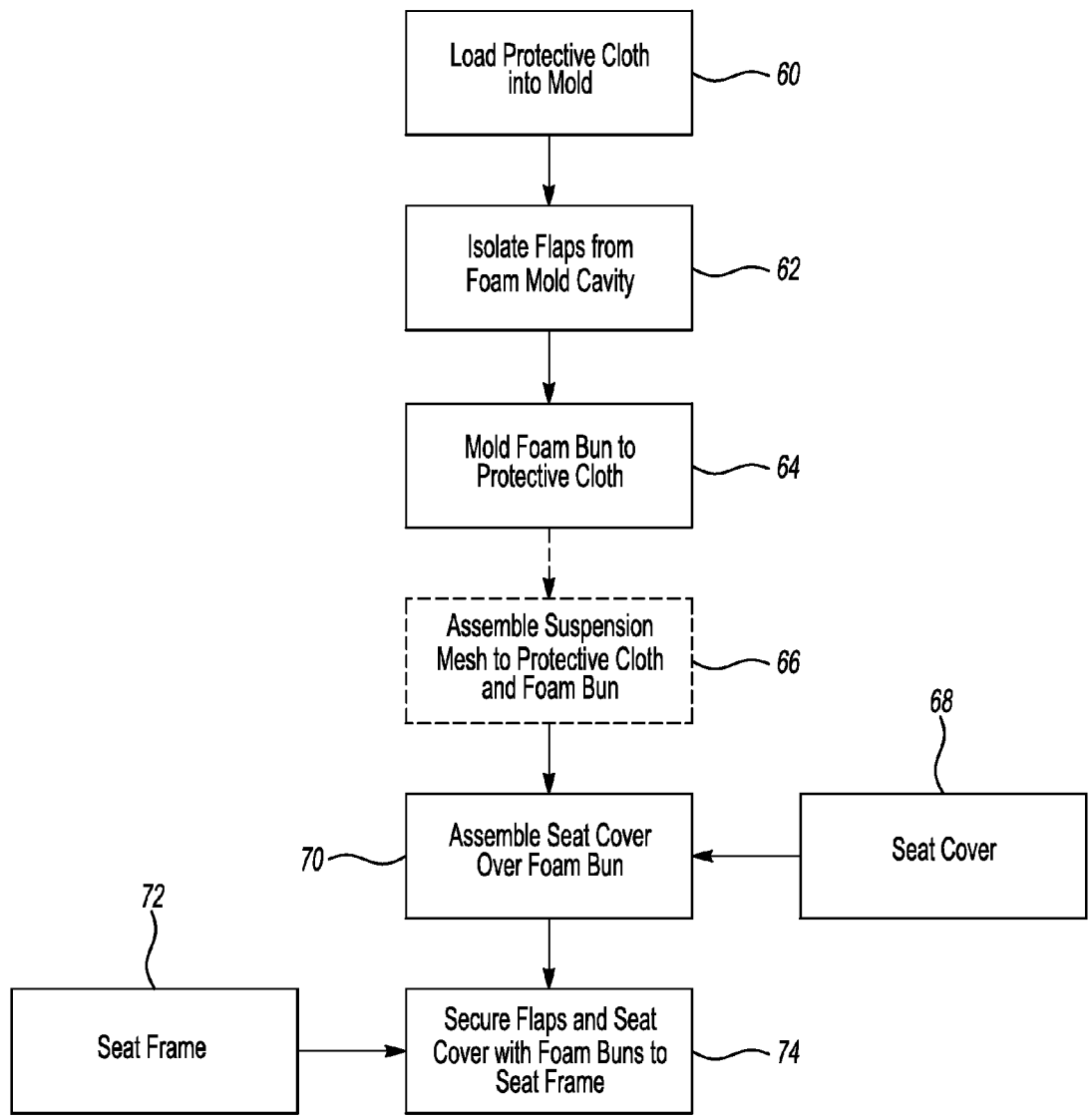
FIG. 9 is a flow chart illustrating the method of making a vehicle seat in accordance with one embodiment of the present invention.

Referring to FIG. 9, the process of the vehicle seat will be described with the understanding that the steps may be performed in a different sequence. The process begins at 60 with the protective cloth being loaded into the mold. Next, the flap of the protective cloth is isolated or otherwise separated from the foam mold cavity so they extend outwardly from the foam bun 20 (as shown in FIG. 2 -8). The foam bun 20 is molded in a foam injection molding operation and is formed around the protective cloth 36 (shown in FIG. 8). In one alternative embodiment, a mesh suspension 44 may be assembled at 66 to the protective cloth 36 and the foam bun 20. The mesh suspension mat 44 provides support to the foam bun 20 on the lower surface of the foam bun 20 (as shown in FIG. 6). A seat cover 68 is provided and is assembled over the foam bun at 70. A seat frame 32 is provided at 72 and is assembled at 74 to the foam bun that is covered by the seat cover 30. The flaps 46 and 48 of the protective cloth 36 extend outwardly from the foam bun 20 and the seat cover 30 and are assembled together with the fasteners, as shown in FIGS. 4 and 5 the cloth flaps 46 and 48 are secured to the seat frame 32 by inserting the fasteners 38 as shown in FIGS. 4 and 5 through the holes 50 shown in FIGS. 6 and 8 and into the seat frame 32. The flaps 46 and 48 of the protective cloth 36 prevent or minimize any chance that unwanted noise can be created in the interface area of the suspension and cushion frame. The cloth flaps 46 and 48 also facilitate assembly of the vehicle seat and reduce or eliminate any esthetic defects in the area of the interface of the trim where the plastic cover 16 is assembled to the side of the seat base 14. According to the invention, the flaps 46 and 48 of the protective cloth 36 avoid foam or trim material from breaking through the plastic cover or frame of the vehicle seat.

Alternatively, the suspension mat 44 may be joined by plastic J-hooks to the protective cloth 36. The cloth flaps 46 and 48 and seat cover 30 may be joined by plastic pins or other fasteners to the frame. The cloth flaps 44 and 46 and seat cover 30 may be fastened to the frame 32 in the foam bun saddling operation. Each flap is of fixed to the frame without increasing the cycle time for saddling the foam bun.

As another alternative shown in FIG. 7, the flaps 46 and 48 of the protective cloth 36 may be bound to the frame 32 by means of j-hooks that affix the flaps 46 and 48 onto the frame. Alternatively, metal brackets maybe provided on the seat frame to receive the J-hooks. Other cloth flaps, such as rear flap 24, may be fixed to the frame on the front, rear, at corners, or an either side of the seat depending upon the seat configuration. The cloth flaps serve to maintain the upholstery in place by joining the flap of the protective cloth to the frame. In addition, the protective cloth 36 and flaps may be integrated into an assembly with the suspension mat 44.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A vehicle seat comprising:
a frame;
a seat base including a foam bun that is attached to the frame;
a seat cover partially enclosing the foam bun; and
a protective cloth embedded into the foam bun, wherein the protective cloth includes at least one cloth flap that extends outwardly from the foam bun to the frame and is secured to the frame by at least one fastener wherein the seat cover and protective cloth are placed at least partially in a face to face relationship at an outer portion of each of the seat cover and the protective cloth.

2. The vehicle seat of claim 1 wherein the frame is a base frame and the foam bun is the seat base and the protective cloth is embedded into the seat base and extends across the width of the seat base.

3. The vehicle seat of claim 1 wherein the seat cover extends across the upper surface of the foam bun and downwardly over the sides of the foam bun, and wherein the seat cover and cloth flap are secured by the same at least one fastener to the frame.

4. The vehicle seat of claim 3 wherein the seat cover and the protective cloth are attached to the frame to completely envelop selected portions of the foam bun adjacent to a location where the protective cloth and the seat cover are both attached to the frame.

5. The vehicle seat of claim 1 wherein the at least one cloth flap further comprises a right flap extending from a right side of the foam bun and a left flap extending from a left side of the foam bun.

6. The vehicle seat of claim 5 wherein the at least one cloth flap further comprises a front flap extending from a front side of the foam bun and a back flap extending from a back side of the foam bun.

7. The vehicle seat of claim 1 wherein the at least one cloth flap further comprises a front flap extending from a front side of the foam bun and a back flap extending from a back side of the foam bun.

8. A method of making a vehicle seat comprising:
   selecting a frame;
   selecting a seat cover;
   placing a protective cloth into a mold having a mold cavity with a plurality of flaps extending outwardly from the mold cavity;
   molding a foam bun in the mold cavity of the mold to embed the protective cloth except for the flaps into the foam bun; and
   assembling the seat cover to the foam bun and attaching the foam bun including the embedded protective cloth to the frame with the flaps wherein during the assembling step the seat cover and protective cloth are placed at least partially in a face to face relationship at an outer portion of each of the seat cover and the protective cloth and wherein the outer portions are attached by at least one fastener to the frame.

9. The method of claim 8 further comprising attaching a suspension mat to the protective cloth after the step of molding the foam bun by attaching the suspension mat to the protective cloth.

10. The method of claim 9 further comprising placing the suspension mat into the mold before molding the foam bun in the mold cavity.

11. The method of claim 8 further comprising attaching at least one cover piece to the frame that extends over a portion of the seat cover, and wherein the protective cloth prevents the foam from being displaced through an interface between the cover piece and the seat cover.

\* \* \* \* \*